United States Patent

Murayama et al.

Patent Number: 6,130,700
Date of Patent: Oct. 10, 2000

[54] ALIGNER, EXPOSURE METHOD AND PRINTER

[75] Inventors: Fumitaka Murayama; Fumiyoshi Ito; Satoru Takizawa, all of Okaya, Japan

[73] Assignee: Cycolor Systems, Inc., Tokyo, Japan

[21] Appl. No.: 09/029,909

[22] PCT Filed: Jul. 7, 1997

[86] PCT No.: PCT/JP97/02352

§ 371 Date: Jun. 8, 1998

§ 102(e) Date: Jun. 8, 1998

[87] PCT Pub. No.: WO98/01303

PCT Pub. Date: Jan. 15, 1998

[30] Foreign Application Priority Data

Jul. 9, 1996 [JP] Japan .................................. 8-179044
Aug. 23, 1996 [JP] Japan .................................. 8-221989

[51] Int. Cl.⁷ ............................................ G09G 3/32
[52] U.S. Cl. .......................................... 347/240; 347/251
[58] Field of Search ................................ 347/240, 262, 347/237, 247, 251, 252, 253

[56] References Cited

U.S. PATENT DOCUMENTS

| | | | |
|---|---|---|---|
| 5,748,225 | 5/1998 | Ziph-Schatzberg | 347/262 |
| 5,818,501 | 10/1998 | Ng et al. | 347/240 |
| 5,917,535 | 6/1999 | Corona | 347/240 |

FOREIGN PATENT DOCUMENTS

| | | | |
|---|---|---|---|
| 0630148A1 | 12/1994 | European Pat. Off. | H04N 1/40 |
| 2137493 | 11/1988 | Japan . | |
| 5211666 | 4/1992 | Japan . | |
| 5278260 | 4/1992 | Japan . | |
| 7214819 | 8/1995 | Japan . | |
| 08039862 | 2/1996 | Japan | B41J 2/44 |
| 863035 | 3/1996 | Japan . | |

*Primary Examiner*—N. Le
*Assistant Examiner*—Lamson D. Nguyen
*Attorney, Agent, or Firm*—Thompson Hine & Flory LLP

[57] ABSTRACT

In an exposure apparatus for exposing a photosensitive medium using light-emitting elements, correction to account for environmental conditions at the time of exposure that change is performed by dynamically changing the value of current or voltage to be supplied to the LEDs. Thereby, control of exposure duration can be performed solely for expression of multi-gradation levels, so that a very high resolution is not required for the control of exposure duration. Therefore, it is possible to realize a low-price exposure apparatus capable of printing multi-gradation images. For exposure to a single color using a plurality of LEDs, the gradation level to be expressed by the individual LEDs is cyclically changed, so that the construction of gradation level control for each LED can be simplified. Further, since the LEDs can be used at substantially equal duties, the individual variation of LEDs does not evidently show. It is also possible to prevent an inconvenient incident where a particular LED deteriorates.

11 Claims, 8 Drawing Sheets

| GRADATION LEVEL | BINARY DATA | LED1 | LED2 | LED3 | LED4 |
|---|---|---|---|---|---|
| 255 | 11111111B | ON | ON | ON | 111111B/63 |
| 127 | 01111111B | ON | OFF | OFF | 111111B/63 |
| 63 | 00111111B | OFF | OFF | OFF | 111111B/63 |
| 31 | 00011111B | OFF | OFF | OFF | 011111B/63 |
| 15 | 00001111B | OFF | OFF | OFF | 001111B/63 |

| GRADATION LEVEL | BINARY DATA (x) | LED1 | LED2 | LED3 | LED4 |
|---|---|---|---|---|---|
| 1020 | 1111111100B | 11111111B | 11111111B | 11111111B | 11111111B |
| 1019 | 1111110111B | 11111110B | 11111111B | 11111111B | 11111111B |
| 1018 | 1111110110B | 11111110B | 11111110B | 11111111B | 11111111B |
| 1017 | 1111110101B | 11111110B | 11111110B | 11111110B | 11111111B |
| 1016 | 1111110100B | 11111110B | 11111110B | 11111110B | 11111110B |
| 1015 | 1111101111B | 11111101B | 11111110B | 11111110B | 11111110B |
| 1014 | 1111101110B | 11111101B | 11111101B | 11111110B | 11111110B |
| ⋮ | ⋮ | ⋮ | ⋮ | ⋮ | ⋮ |
| 7 | 0000000111B | 00000001B | 00000010B | 00000010B | 00000010B |
| 6 | 0000000110B | 00000001B | 00000001B | 00000010B | 00000010B |
| 5 | 0000000101B | 00000001B | 00000001B | 00000001B | 00000010B |
| 4 | 0000000100B | 00000001B | 00000001B | 00000001B | 00000001B |
| 3 | 0000000011B | 00000000B | 00000001B | 00000001B | 00000001B |
| 2 | 0000000010B | 00000000B | 00000000B | 00000001B | 00000001B |
| 1 | 0000000001B | 00000000B | 00000000B | 00000000B | 00000001B |
| 0 | 0000000000B | 00000000B | 00000000B | 00000000B | 00000000B |

ALIGNER, EXPOSURE METHOD AND PRINTER

TECHNICAL FIELD

The present invention relates to an exposure apparatus, an exposure method and a printing apparatus that are capable of forming an image on a photosensitive sheet such as a Cycolor medium.

BACKGROUND OF THE INVENTION

As a method for forming a color photograph or a color print, there is a method for forming an image, such as a picture or a character, on a photosensitive sheet by exposing the sheet. There are different types of photosensitive sheets, for example, a photosensitive sheet employing a multi-layer color development method, in which sheet three or more layers of photosensitive emulsions with different color sensitivities are layered on a single supportive sheet thus forming a photosensitive member, a photosensitive sheet that employs a film in which each emulsion layer contains a pigment and a developing agent so that the film is capable of being exposed and developed simultaneously, and the like. A still another photosensitive sheet is a so-called Cycolor medium, which employs, as a photosensitive material, microcapsules (cyliths) that contain a chromogenic substance and a photoinitiator. In the Cycolor medium, a thin supportive body formed from, for example, polyester, is coated with numerous cyliths of a very small size. When exposed to light, cyliths harden so that only the cyliths of a specific color are activated, and the cyliths are ruptured by pressurization, thereby forming a predetermined image of a specific color. Other photosensitive sheets have different color development principles, but are exposed to light of the color of an image or its complementary color to form an image.

In widely used methods for exposing a photosensitive sheet as described above, white light is split into three primary colors by a filter or the like, and images are formed using the individual primary colors, and then combined to form an image of predetermined colors or an image of their complementary colors on the photosensitive media. Another technology has recently been developed, as disclosed in Japanese patent application laid-open Nos. Hei 5-211666 and Hei 5-278260, in which LEDs or lasers that emit red, green and blue light are employed as light-emitting sources, and the light-emitting sources are controlled so that an image of predetermined colors is formed on a photosensitive sheet and the sheet is thereby exposed.

Employment of LEDs or the like as light sources (light-emitting elements) for individual colors allows a compact construction of the light sources. Furthermore, provision of the light sources for individual colors enables control of exposure duration, brightness and the like. For a photosensitive sheet employing photosensitive materials having different exposure characteristics for individual colors, a design has been considered in which the exposure duration and brightness can be set appropriately for each color, whereby it will become possible to form images with good color balance and reduced color distortion on a medium in which the photosensitive materials have different exposure characteristics to different colors.

A printing apparatus 10, as shown in FIG. 1, equipped with an exposure apparatus having LEDs or lasers as light-emitting elements, has been developed. In the printing apparatus 10, an exposure head 15 is mounted on a carriage 13, and the carriage 13 is moved along a shaft 12 in scanning directions X. A photosensitive sheet 1, such as a Cycolor medium, is conveyed by a sheet-conveying roller 11 in a predetermined direction (sheet-conveying direction) Y. The photosensitive sheet 1 is thereby moved relative to the light-emitting elements of the exposure head 15, so that the entire photosensitive sheet is exposed to light from the LEDs or lasers of the exposure head 15 to form an image.

FIGS. 2 shows an example of the arrangement of the exposure head 15, especially relating to the exposure head 15 having LEDs 31 for red color (R). In the exposure head 15, exposure is performed by light-emitting sources 21 each having four LEDs 31 for a single color. Each LED 31 of the light-emitting source 21 emits light when power is supplied thereto from a power supplying circuit 23. The light emitting duration (exposure duration) of each LED 31 is controllable by a switching circuit 22. The power supplying circuit 23 has a constant voltage power source 34, and semi-fixed resistors 33 for setting the power supplied to the corresponding LEDs 31 in accordance with the brightness of the corresponding LEDs 31. During assembly in a factory or immediately before shipment, the semi-fixed resistors 33 are adjusted so that the brightness of the red (R), green (G) and blue (B) light emitting sources become predetermined values at the time of shipment. Normally, the individual variation of LEDs is large and the variation in amount of light emission (brightness) is large, and many photosensitive sheets have different sensitivities depending on wavelengths. Therefore, the semi-fixed resistors 33 are provided in the power supplying circuit 23 to set power supplied to each LED in accordance with the variations of LEDs and basic characteristics of photosensitive sheets depending on wavelengths.

In the switching circuit 22, a transistor switch 32 is provided for each LED 31. A CPU 25 controls a timing generating circuit 24 on the basis of pixel gradation information. Each transistor switch 32 is turned on and off by a signal from the timing generating circuit 24. Therefore, the duration of power supply to each LED 31 is controlled by the signal from the timing generating circuit 24, so that the duration of exposure of a photosensitive sheet can be controlled separately for each color and each LED 31.

As described above, while it has a simple circuit arrangement, the exposure head 15 shown in FIG. 2 is able to absorb or offset the individual variations of the LEDs by using the semi-fixed resistors. Therefore, it is possible to provide initial settings in accordance with the basic characteristics of a photosensitive sheet to be exposed. However, since the forward voltage of the LEDs 31 and the voltage between the collector and emitter of each transistor switch 32 changes depending on temperature, the value of drive current supplied to the LEDs 31 changes with changes in ambient temperature or operating conditions of the exposure head 15. As a result, the color tone of an image formed by exposure may vary or uneven color development may occur, depending on the operating conditions.

FIG. 3 shows another example of the exposure head 15 having LEDs. In this exposure head 15, constant current circuits 35 are provided in a power supplying circuit 23 corresponding to LEDs 31 provided in a light emitting source 21, so that the initial setting of the current to be supplied to the LEDs 31 from the constant current circuits 35 can be made using the semi-fixed resistors 33. Therefore, a constant current is supplied to each LED 31 despite changes in temperature depending on operating conditions, so that images with relatively stable color tones can be obtained.

However, in the exposure head 15, the semi-fixed resistors, provided in the same number as that of the LEDs, are adjusted at a timing when the initial setting of the semi-fixed resistors is possible, such as at the time of shipment. Once adjusted, the semi-fixed resistors cannot be re-adjusted. Therefore, for changes of the environmental conditions (printing environments) which occur despite maintenance of constant current values, for example, fluctuation of brightness of LEDs depending on temperature, sensitivity variations of a photosensitive sheet, temperature-dependent sensitivity changes of the photosensitive sheet, lightness changes or color tone changes made in accordance with user's taste, and the like, this exposure head 15 also requires that the duration of exposure by the LEDs be changed by controlling the switching circuit 22 during operation of the printing apparatus to achieve corrections for changes in brightness of LEDs and the like.

The duration of exposure by LEDs is controlled by the switching circuit 22, the CPU 25 and the timing generating circuit 24, and can be used as a basis for corrections for changes in printing environments and gradation control if the gradation level is as low as about several tens of gradation increments. However, since graduation control at a level of about 256–1024 gradation increments is recently required, a control mechanism with a resolution higher than the graduation level is needed in order to perform gradation control and corrections for changes in brightness and the like on the basis of exposure duration. Therefore, the control mechanism, the exposure head and the printing apparatus become very expensive. As the gradation level increases, such cost increases become greater. To solve this problem, it is possible to use LEDs that have reduced individual variations and stable temperature characteristics and therefore requires brightness adjustment to a less extent, or to use photosensitive sheets in which the characteristic variation among lots is small. This may curb the cost increase of the exposure duration control mechanism, but results in cost increases of LEDs and photosensitive sheets.

If corrections for environmental changes are performed on the basis of exposure duration, the exposure duration per exposure cycle of a single dot becomes short when, for example, the LED brightness is increased. Therefore, if the gradation level becomes high, it becomes impossible to secure a sufficient resolution in the direction of the time axis for graduation control, so that sufficient graduation expression cannot be obtained. Then, various problems arise. That is, if the correction is simplified in order to obtain sufficient gradation expression, the image resolution decreases depending on temperature or the sensitivity of photosensitive sheets. Conversely, if the gradation level control is simplified, desired color expression may not be obtained. It is possible to increase the exposure duration in order to secure a certain resolution. However, an increase in exposure duration per dot will considerably increase the time required for printing.

Accordingly, it is an object of the invention to provide an exposure apparatus, an exposure method and a printing apparatus that always allow easy correction for changes in environmental conditions that include temperature regarding light-emitting elements, such as LEDs, sensitivity of photosensitive sheets, and, in addition to correction for changes in environmental conditions, provide sufficient gradation expression. It is an another object of the invention to make it possible to provide an exposure apparatus and a printing apparatus that have a function for correction regarding environmental conditions and a function capable of gradation expression at a high gradation level. It is still an another object of the invention to provide an exposure apparatus and a printing apparatus that perform printing with high image quality without requiring expensive LEDs or a photosensitive sheet which have stable characteristics.

It is a further object of the invention to provide an exposure apparatus and an exposure method that allow easy initial setting of light-emitting elements using a simple circuit arrangement and that allow a user to easily correct or adjust the conditions of exposure by light-emitting elements even after shipment from a factory.

SUMMARY OF THE INVENTION

According to the invention, a power control portion capable of dynamically changing the power supplied to light-emitting elements by controlling the current or voltage supplied to the light-emitting elements, and a time control portion capable of dynamically changing and controlling the exposure duration are provided. Therefore, one of the power control portion and the time control portion performs gradation display, and the other corrects exposure conditions for environmental changes. For example, the time control portion is used for the gradation expression, and the power control portion is used for the correction, so that corrections regarding variations in temperature or the sensitivity of photosensitive sheets can be performed without reducing the resolution needed for the gradation expression.

The exposure apparatus of the invention is characterized by comprising: a light-emitting element that emits light for exposure of a photosensitive sheet; a power control portion capable of controlling current or voltage or both to be supplied to the light-emitting element; and a time control portion capable of controlling duration of exposure by the light-emitting element, one of the power control portion and the time control portion performing gradation expression of an image formed on the photosensitive sheet, and the other one performing correction of an exposure condition in accordance with an environmental change at the time of exposure.

Compared with the power control portion for controlling power supplied to the light-emitting element by changing current or voltage, the time control portion allows easy employment of switching control, so that a high resolution can be obtained. Therefore, it is preferable to use the time control portion to perform the gradation display and use the power control portion to perform the correction in accordance with changes in printing environments. If the correction in accordance with environmental changes is performed separately from the gradation display, the control portion for the gradation display, for example, the time control portion, has a reduced control load. Therefore, it is possible to employ simple circuits whose resolution is not so very high, in the time control portion, which circuits can be obtained at low costs.

In the exposure apparatus of the invention, since the value of current or voltage supplied to the light-emitting elements, such as LEDs, semiconductor lasers or the like, can be controlled, that is, dynamically changed, at the time of an exposure operation, the brightness itself of the light-emitting element can be dynamically adjusted. Therefore, the power control portion is able to maintain constant brightness of the light-emitting elements by correcting for changes in characteristics of the light-emitting elements depending on temperature changes. It is also possible to change the brightness of the light-emitting elements to cope with lot variations of photosensitive sheets or changes in photosensitive sheet sensitivity due to temperature changes. Furthermore, it is possible to cope with a lightness change or a color tone change according to user's taste by the power control portion controlling the brightness of the light-emitting elements. Since all the exposure conditions that require correction depending on changes in printing environments can be adjusted by dynamically changing the brightness of the light-emitting elements in the manner described above, the time control portion only needs to control the exposure duration on the basis of gradation information. Therefore, the resolution of the side of gradation control is free from the burden of correction regarding environmental conditions, but time can be fully utilized on the gradation control side so that a high resolution for gradation expression can be reliably provided. Further, it becomes unnecessary to provide the time control portion with a resolution that is higher than the resolution required in order to reproduce image data. Therefore, the exposure apparatus of the invention is able to print high-quality multi-gradation images using a small-size simple time control portion. Therefore, using the exposure apparatus of the invention, it becomes possible to provide a low-price, small-size printing apparatus capable of printing an image expressed with multi-gradations.

If the power control portion is used to perform correction based on the temperature in the vicinity of the light-emitting elements, the exposure apparatus of the invention further comprises: a set value control portion capable of changing a value of current or voltage to be supplied from the power control portion to the light-emitting element; a temperature sensor that detects a temperature in the vicinity of the light-emitting element; and a memory capable of storing data regarding and the direct or indirect value of current or voltage supplied to the light-emitting element when brightness of the light-emitting element is corrected and a temperature at that time, wherein the set value control portion controls the value of current or voltage to be supplied to the light-emitting element, on the basis of data in the memory and the temperature detected by the temperature sensor. An input portion capable of inputting information regarding sensitivity of the photosensitive sheet may also be provided, so that a set value control portion corrects the value of current or voltage to be supplied to the light-emitting element on the basis of the information regarding sensitivity of the photosensitive sheet. Therefore, it becomes possible to correct exposure conditions for variation in photosensitive sheet sensitivity. Since the value of current or voltage and the temperature at the time of the correction are stored in the memory, the initial setting of exposure conditions can be easily performed. Furthermore, it also becomes possible to correct the exposure conditions by updating the data in the memory during use.

The exposure apparatus described above is able to perform correction of exposure conditions and gradation control using an exposure method comprising the following steps:

1. Temperature in the vicinity of an light-emitting element is detected.
2. The temperature detected in the first step is compared with a temperature at the time of correction of brightness of the light-emitting element, and a value of current or voltage to be supplied to the light-emitting element for exposure is set on the basis of a value of current or voltage supplied to the light-emitting element at the time of the correction.
3. A duration of exposure by the light-emitting element is determined on the basis of information regarding gradation of an image.
4. A photosensitive sheet is exposed by supplying the light-emitting element with the set value of current or voltage, for the duration of exposure.

In the second step, it is also possible to correct the current or voltage to be supplied to the light-emitting element in accordance with the information regarding the sensitivity of a photosensitive sheet or user's taste of lightness or color tone.

This exposure method may be provided as a logic circuit in the form of hardware, or may be provided in the form of software for controlling a microcomputer or the like, which is installed in a memory medium, such as a ROM, that can be readable by a computer.

As described above, the exposure apparatus of the invention is able to dynamically perform correction of exposure conditions based on changes in environments, such as temperature, photosensitive sheet sensitivity variation and the like, and is able to secure a resolution required for gradation control without using an expensive control mechanism. Therefore, using a printing apparatus comprising the exposure apparatus of the invention and a conveying apparatus that conveys at least one of a photosensitive sheet and the exposure apparatus at a predetermined timing relative to each other, it is possible to provide a low-price, small-size printing apparatus capable of printing color images with stable high quality without being affected by variations in temperature or photosensitive sheet sensitivity.

If a plurality of groups of light-emitting elements are assigned to a color and a plurality of groups of light-emitting elements are used to display or express gradations, it is preferable to control light emission of the light-emitting elements at substantially equal duties. However, if each group of light-emitting elements are controlled with a high resolution of, for example, 1000 gradations, the hardware cost becomes very high. In this invention, the gradation level of the individual light-emitting elements (light sources), such as LEDs, of the plurality of groups is cyclically changed in accordance with the total gradation level of exposure of each dot. In this manner, the gradation level required for control of each groups of light-emitting elements can be reduced, and the light-emitting elements of all the groups can be turned on at substantially equal duties.

That is, an exposure apparatus according to the invention is characterized by further comprising: a plurality m of groups of the light-emitting elements (light sources), and a gradation control portion capable of setting a gradation level for gradation expression using one of the power control portion and the time control portion, the gradation control portion having a main gradation level control potion to which gradation information capable of instructing a gradation level whose maximum is an integer n is inputted, and m number of gradation level setting portions into which l number of gradation levels, wherein l is an integer equal to or greater than an integer obtained by dividing the integer n by the integer m, can be set with respect to each group of the light-emitting elements, wherein the main gradation level control portion sets a gradation level j+1 which is higher by 1 than a gradation level j, into gradation level setting portions pre-set within a kth position, and sets the gradation level j into the other gradation level setting portions, wherein j is an integer obtained by division of a gradation level i of the gradation information by the integer m, and k is a remainder obtained by the same division.

For example, in an exposure apparatus comprising four groups of light-emitting elements, each group having a single light-emitting element, that is, in an exposure apparatus comprising four light-emitting elements, a resolution of about 1000 gradation levels may be achieved by providing a main gradation level control portion to which 10-bit gradation information capable of instructing about 1000 gradation levels is inputted, and four 8-bit gradation level setting portions into which 256 gradation levels can be set with respect to each of the four light-emitting elements. In this arrangement, the main gradation level control portion sets the higher 8 bits of gradation information, that is, an integer obtained by dividing the 10-bit gradation information by 4, into the gradation level setting portions, and 1 is added to the value of the gradation level setting portions corresponding to the lower 2 bits of the gradation information, that is, the value of a remainder obtained through the division of the 10-bit gradation information by 4. Then the light-emitting elements are turned on in accordance with the values of the corresponding gradation level setting portions.

If gradation levels are set in the time control portion using the gradation control portion, it is possible to duty-control the individual light-emitting elements on the basis of the values of the corresponding gradation level setting portions. Further, if the duration of exposure by the individual groups of light-emitting elements is cyclically changed at 8-bit gradation levels, the duration of exposure by all the light sources has a resolution corresponding to 10-bit gradation information.

In an exposure method according to the invention wherein gradation expression is performed, the light-emitting elements pre-set within the kth position among m number of groups of light-emitting elements are caused to emit light at a gradation level j+1 which is higher by 1 than a gradation level j, and the other light-emitting elements are caused to emit light at the gradation level j, wherein j is an integer obtained by division of a gradation level i, instructed for a certain dot, by the integer m, and k is a remainder obtained by that division. Therefore, an exposure method for forming an image by scanning individual dots with light emitted from four groups of light-emitting elements for each color, is characterized in that when exposure duration is set in the above-described third step and the light-emitting elements are turned on in the fourth step, the following steps are repeatedly performed:

(a) With 10-bit gradation information capable of instructing about 1000 gradation levels, the higher 8 bits of the gradation information are set into 8-bit gradation level setting portions provided corresponding to the four groups of light-emitting elements.

(b) The value of the gradation level setting portions corresponding to the lower 2 bits of the gradation information is incremented by 1.

(c) The values of the gradation level setting portions are set in the time control portion, and the light-emitting elements are turned on at duties corresponding to the gradation level setting portions, thereby performing exposure.

The exposure method comprising the above-described steps may be provided as a logic circuit in the form of hardware, and may also be provided in the form of software for controlling a microcomputer, which software is installed in a ROM or the like.

By cyclically controlling the gradation levels of the plurality of groups of light-emitting elements in the manner describe above, it become possible to achieve gradation levels indicated by, for example, 10-bit gradation information, based on 8-bit gradation levels for each light source. Therefore, the hardware for controlling the light sources can be simplified, and multi-gradation expression can be achieved without requiring a very high resolution of the hardware. Consequently, it becomes possible to print an image with multi-gradation levels using low-cost hardware.

Furthermore, since the light-emitting elements are turned on at substantially equal gradation levels with the difference being at most 1 level, their duties also become substantially equal. Therefore, the problem of brightness changes during exposure is eliminated, and the problem of deterioration of a particular light source is also prevented.

DETAILED DESCRIPTION OF THE PREFERRED EMBODIMENT

Figure 4:
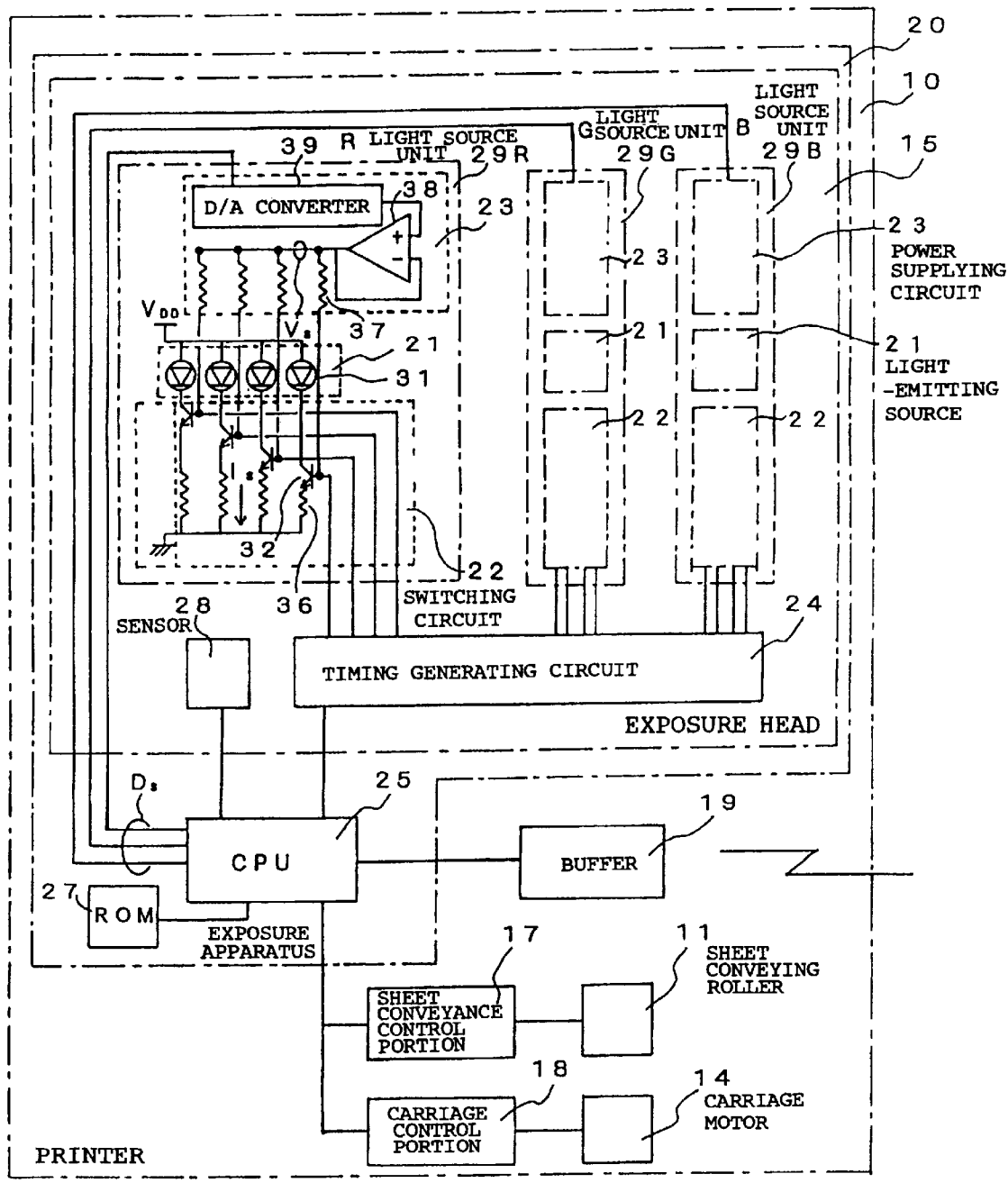
FIG. 4 is a block diagram schematically illustrating a construction of a printer according to the invention.

Embodiments of the invention will be described hereinafter with reference to the drawings. FIG. 4 shows a block diagram of a printing apparatus 10 according to the invention. The general construction of the printing apparatus (printer) 10 is substantially the same as that shown in FIG. 1. An exposure head 15 is mounted on a carriage 13 which is moved relative to a photosensitive medium 1 in scanning directions X. The medium 1 is conveyed in a sheet conveying direction Y perpendicular to the scanning directions X. Therefore, the exposure head 15 is operated over the entire medium 1 to form an image.

As shown in FIG. 4, the printer 10 of this embodiment is designed to be generally controlled by a CPU 25, that is, a central processing unit. Under control of the CPU 25, the exposure head 15 and the photosensitive print sheet (medium) 1 are moved in accordance with the exposure cycle of exposure of individual dots on the medium 1. To perform such control, the CPU 25 has a function of controlling a sheet conveying roller 11 through a sheet conveyance control portion 17, and a function of controlling a carriage motor 14 for reciprocating the carriage 13 along a shaft 12 in the scanning directions X through a carriage control portion 18. The CPU 25 further has a function of receiving image data, including gradation data, from a host apparatus, such as a personal computer, via a buffer 19, and exposing the medium 1 by controlling the exposure head 15 on the basis of the image data received.

An exposure apparatus 20 of this embodiment employs LEDs 31 as light-emitting elements. The exposure apparatus 20 has light source units 29R, 29G, 29B that are provided with a plurality (four in this embodiment) of LEDs 31 of three primary colors (red (R), green (G) and blue (B) in this embodiment, but cyan, magenta and yellow are also possible), respectively. Since the light source units 29R, 29G and 29B have the same construction, the red light source 29R will be described below as a representative. The light source unit 29R has a light-emitting source 21 having four LEDs 31 as light-emitting elements, a power supplying circuit 23 having a function of controlling the current supplied to the LEDs 31, and a switching circuit 22 having a time control function of controlling exposure duration by controlling the duration of energization of the LEDs 31. The switching circuit 22 has four transistor switches 32 for turning on and off the corresponding LEDs 31. In this embodiment, the collector side of each npn-type transistor switch 32 is connected to the corresponding LED 31, and the emitter side thereof is grounded via an emitter resistor 36. The base side of each transistor switch 32 receives a timing signal for controlling the on/off timing from a timing generating circuit 24. When the timing signal is ON, open collector condition is established. When the timing signal is OFF, ground connection is established to provide a low electric potential.

Power Supplying Circuit

The power supplying circuit 23, which controls the power supplied to the LEDs 31, has a D/A converter 39 for converting a set value Ds supplied from the CPU 25 in the form of a digital signal, into an analog signal, and an operational amplifier 38 for maintaining an electric potential on the base side of each transistor switch 32 at a set voltage Vs supplied from the D/A converter 39, and pull-up resistors 37 for limiting the current at the time of control of the transistor switch 32. In the light source unit 29R of this embodiment, when the timing signal from the timing generating circuit 24 becomes open collector, the base-side electric potential of the transistor switch 32 is raised by the set voltage Vs supplied from the D/A converter 39, so that the transistor switch 32 turns on. The LED 31 thereby emits light. The current through the transistor switch 32, that is, the current supplied to the corresponding LED 31, increases until the electric potential caused by a voltage drop of the emitter resistor 36 reaches the set voltage Vs. When the set voltage Vs is reached, that current value is maintained. When the timing signal becomes the grounded electric potential, the base-side electric potential of the transistor switch 32 decreases, so that the transistor switch 32 turns off. The power supply to the LED 31 is thereby discontinued, so that the LED 31 goes out. By controlling the timing signal in this manner, the on/off timing of the LEDs 31 is controlled. Thereby, the exposure duration during which the medium 1 is exposed to light emitted from the LEDs 31 is controlled.

In the light source unit 29R of this embodiment, the lighting duration of each LED 31, that is, the exposure duration, is controlled by the timing signal supplied from the timing generating circuit 24. The same control is performed in the other light source units 29G and 29B. In the light source units 29R, 29G, 29B of this embodiment, a constant value Is of current determined by the set voltage Vs flows to the LEDs 31 during the lighting thereof. The current value Is can be freely controlled by varying the set voltage Vs. Since the set voltage Vs is set by the digital value Ds supplied from the CPU 25, the exposure apparatus 20 of this embodiment always allows free dynamical control of the value of current supplied to the LEDs 31 through the CPU 25. Furthermore, as shown in the drawings, the exposure apparatus 20 of this embodiment supplies digital set values Ds from the CPU 25 to the light source units 29R, 29G, 29B, separately, so that the current supplied to each light source unit 29R, 29G, 29B can be dynamically controlled.

The timing generating circuit 24, which controls the LEDs 31 of each light source unit 29R, 29G, 29B, receives a signal regarding colors and gradations, from the CPU 25 based on the image data inputted into the buffer 19. The construction of the timing generating circuit 24 will be described in detail later. The timing generating circuit 24 outputs timing signals at exposure duration timings suitable to the colors and gradation displays indicated by the image data supplied thereto. The timing signals are supplied to the transistor switches 32 of the switching circuit 22 of each light source unit 29R, 29G, 29B. In the exposure apparatus 20 of this embodiment, the light source units 29R, 29G, 29B and the timing generating circuit 24 are mounted in the exposure head 15. The light source units 29R, 29G, 29B and the timing generating circuit 24 are supplied, from the CPU 25, with signals regarding colors and gradations, and the set value Ds for controlling the value of current supplied to each light source unit 29R, through a flexible cable or the like.

The exposure apparatus 20 of this embodiment further has a temperature sensor 28 for detecting a temperature in the exposure head 15, and an EE-PROM 27, that is, a memory, capable of storing data for corrections, a temperature coefficient table for temperature corrections, programs for the CPU 25, and other set values and the like. These are accessible by the CPU 25 anytime. Stored in the temperature coefficient table of the EE-PROM (hereinafter, referred to as "ROM") 27 are a temperature at the time of correction of the brightness of the LEDs 31 of the light source, the set values Ds corresponding to the values of current supplied to the light source units 29R, 29G, 29B at the time of correction of the LED brightness. Therefore, the CPU 25 compares the temperature detected by the temperature sensor 28 with the temperature at the time of correction, and corrects the set value Ds at the time of correction in accordance with the values in the temperature coefficient table to calculate set values Ds suitable to the interior temperature of the exposure head 15. The set values Ds are then supplied to the light source units 29R, 29G, 29B.

The exposure apparatus 20 of this embodiment is capable of receiving from the host apparatus via the buffer 19, data regarding photosensitive sheet sensitivity variation, and data regarding image lightness (brightness and/or clearness) in accordance with user's taste, and updating the data in the ROM 27 with the received data, and holding the updated data. Therefore, the set values Ds calculated on the basis of the interior temperature of the exposure head 15 can be further adjusted with the conditions in printing environments, such as photosensitive sheet sensitivity variation, image lightness and the like, to calculate final values Ds using those factors. The final set values Ds are supplied to the light source units 29R, 29G. 29B. The data regarding photosensitive sheet sensitivity variation and the like may also be inputted directly into the printer 10, in addition to being supplied from the host apparatus. It is further possible to indicate data regarding sensitivity variation on a photosensitive sheet using bar codes and the like so that at the time of exposure, the data is read and set values Ds are automatically adjusted in the printer 10.

It is also possible to update or rewrite the temperature coefficient table stored in the ROM 27 via the buffer 19. Thereby, initial setting at the time of shipment or the like, and maintenance at the time of replacement of the exposure head 15 become very easy. Furthermore, it becomes possible to perform finer color tone control and the like by a user tuning the temperature coefficient table.

As described above, the exposure apparatus 20 of this embodiment is able to dynamically change the power supplied to the LEDs by automatically adjusting the set values Ds supplied to the power supplying circuit 23, at suitable timings, and is able to perform corrections considering changes in general environmental conditions that differ from one printer to another, such as individual variations among LEDs 31, accordance to basic characteristics of photosensitive sheets, changes in brightness of the LEDs 31 depending on the temperature of the exposure head 15, and the like, and is able to also perform suitable corrections at suitable timings, with respect to factors, such as temperature correction, which fluctuate daily or depending on installed environments. Furthermore, it is also possible to perform corrections, at any time, based on factors related to changes in the print conditions that may vary for each print job, such as photosensitive sheet sensitivity variation, color tone, print image lightness in accordance with user's taste, and the like. Therefore, the exposure apparatus 20 of this embodiment is able to perform all the corrections of exposure conditions related to environmental changes at the time of exposure, including individual LED variations, temperature correction, photosensitive sheet sensitivity variation, and the like.

Therefore, the timing signal supplied from the timing generating circuit 24 allows full use of the duration of each cycle of exposure (exposure cycle) for the purpose of gradation (contrast) expression. Therefore, signals for high resolution suitable to multi-gradation expression can be supplied to the transistor switch 32 of the switching circuit 22. Therefore, the exposure apparatus 20 of this embodiment enables exposure to form a high-quality image with multi gradations. For the exposure duration control, the resolutions of the switching circuit 22, the timing generating circuit 24 and the CPU 25 need only to be levels such that gradation expression of image data can be sufficiently performed. For example, to express an image with 1024 gradations, the switching circuit 22, the timing generating circuit 24 and the CPU 25 used need only to be able to process signals with a resolution of 1024 gradations. It is possible to prevent inconveniences due to exposure conditions are also corrected on the side of exposure duration, for example, wherein a function having a resolution higher than 1024 gradations is required for express 1024 or lower gradations, or wherein a circuit capable of processing 1024 gradations actually performs gradation expression of 256 gradations or lower-level gradations. That is, the circuits for controlling exposure duration are allowed to employ mechanisms for handling data of a resolution that matches gradation expression of, for example, 256 gradations, 1024 gradations or the like, and do not need to employ higher-resolution mechanisms considering print environments such as temperature. Therefore, the exposure apparatus 20 capable of high-quality color printing with multi gradations, and the printer 10 employing the exposure apparatus 20 can be reduced in size and can be provided at low costs.

Figure 5:
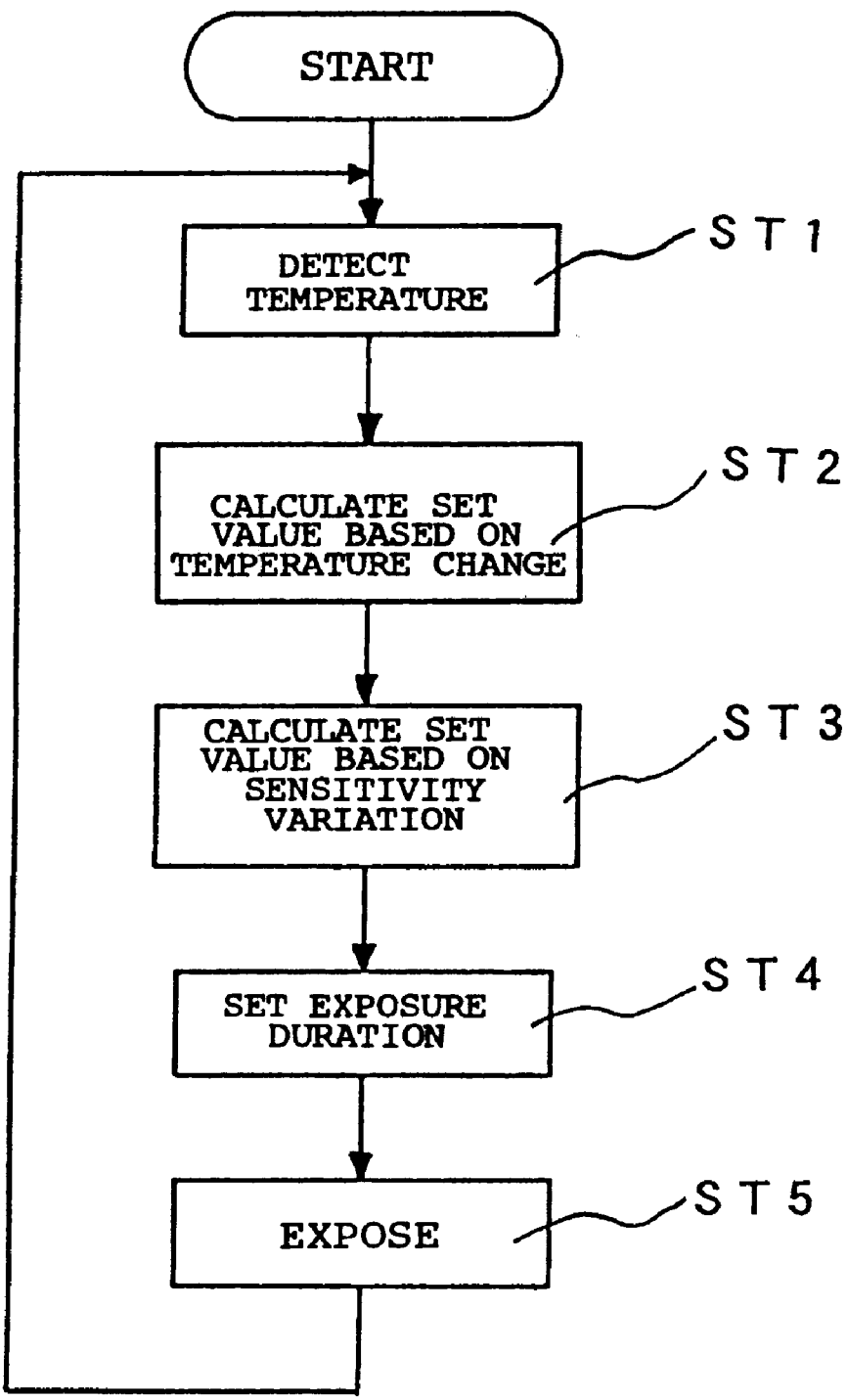
FIG. 5 is a flowchart illustrating an exposure method wherein the power control of the printer shown in FIG. 4 is performed.

FIG. 5 shows a flowchart roughly illustrating the processing by the exposure apparatus 20 of this embodiment. In step ST1, the exposure apparatus 20 of this embodiment detects a temperature in the vicinity of the LEDs 31 of the exposure head 15 using the temperature sensor 28 as described above. The forward voltage across the LEDs 31 and the voltage between the collector and emitter of each transistor switch 32 used in the switching circuit 22, and the like, have several factors that change depending on temperature. Therefore, the exposure apparatus 10 of this embodiment dynamically controls the power to the LEDs 31 by controlling the current or voltage supplied to the LEDs 31 on the basis of temperature so that the brightness of the LEDs 31 is maintained at a constant level when the temperature changes. Further, it is preferable to take into consideration changes in the temperature characteristics of the transistor switches 32 when the value of current or voltage is controlled. Thus, in step ST2, the temperature detected in step ST1 is compared with the temperature at the time of correction stored in the temperature coefficient table of the ROM 27. In the temperature coefficient table of the ROM 27, differences relative to the temperature at the time of correction are in correspondence to coefficients to be used to correct the value of current and/or voltage (in this embodiment, the indirect set value Ds for the current or voltage supplied to the power supplying circuit 23) on the basis of the corresponding temperature differences. Therefore, in step ST2, a set value Ds corresponding to the detected temperature is determined from the temperature at the time of correction and a set value using interpolation or the like. Then, the set value Ds for temperature correction that will achieve exposure conditions corresponding to the detected temperature is calculated.

In step ST3, the exposure apparatus 20 of this embodiment corrects the set value Ds for temperature correction on the basis of photosensitive sheet sensitivity variation, image lightness and other conditions, and thereby calculates set values Ds to be supplied to the individual power supplying circuits 23. If there is a setting for user's color tone or the like, the setting is reflected on the set values Ds. In this manner, the exposure apparatus 20 of this embodiment is able to control the set values Ds at any time in steps ST2 and ST3 so that changes in the printing environments of the exposure apparatus 20, such as temperature, photosensitive sheet sensitivity variation, user's taste and the like, are reflected. Because the value of current and/or voltage supplied to the LEDs 31 can be freely controlled using the set values Ds, the conditions of exposure by light-emitting elements, such as LEDs, can be suitably set by dynamically controlling the brightness of the LEDs 31.

Subsequently in step ST4, exposure duration is set on the basis of the gradation information of pixels to be exposed. In step ST5, based on the exposure duration, the timing generating circuit 24 outputs to the switching circuit 32 timing signals for causing LEDs 31 to emit light or turning LEDs 31 off. Therefore, each transistor switch 32 of the switching circuit 22 turns on for the exposure duration corresponding to the gradation level to supply the corresponding LED 31 with a predetermined value of power based on the set value Ds set in the steps described above, thereby performing exposure. When the exposure ends, the operation returns to step ST1, where temperature is detected again.

Such processing can be provided as software that can be executed by the CPU 25. It is possible to store the software in the ROM 27 so that the software is loaded at a suitable timing to control the CPU 25.

Figure 2:
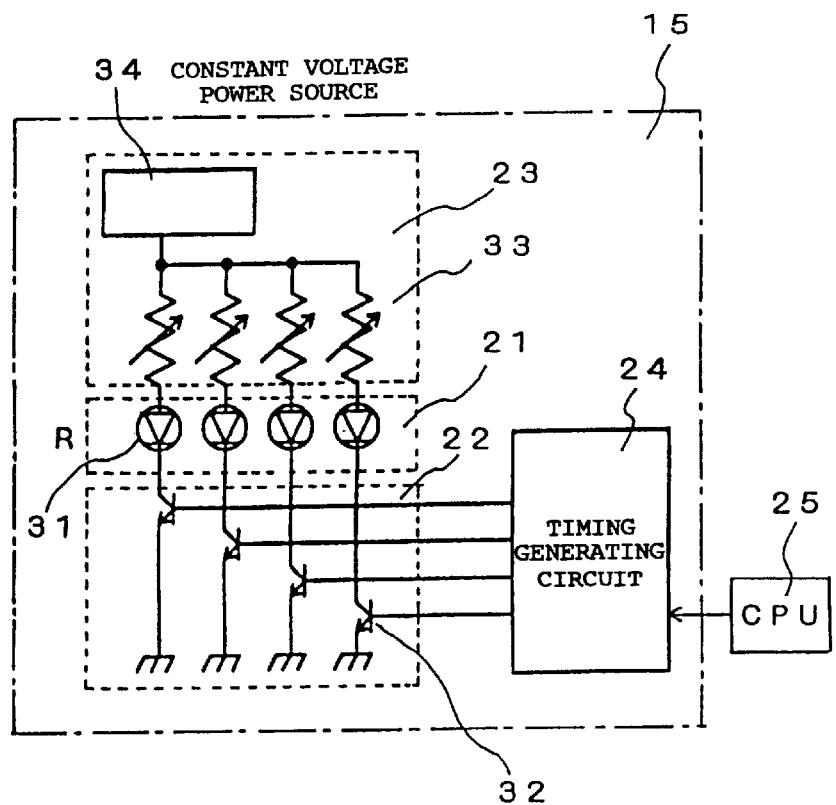
FIG. 2 is a diagram illustrating an example of the exposure apparatus having a function of adjusting variations in LED brightness.
Figure 3:
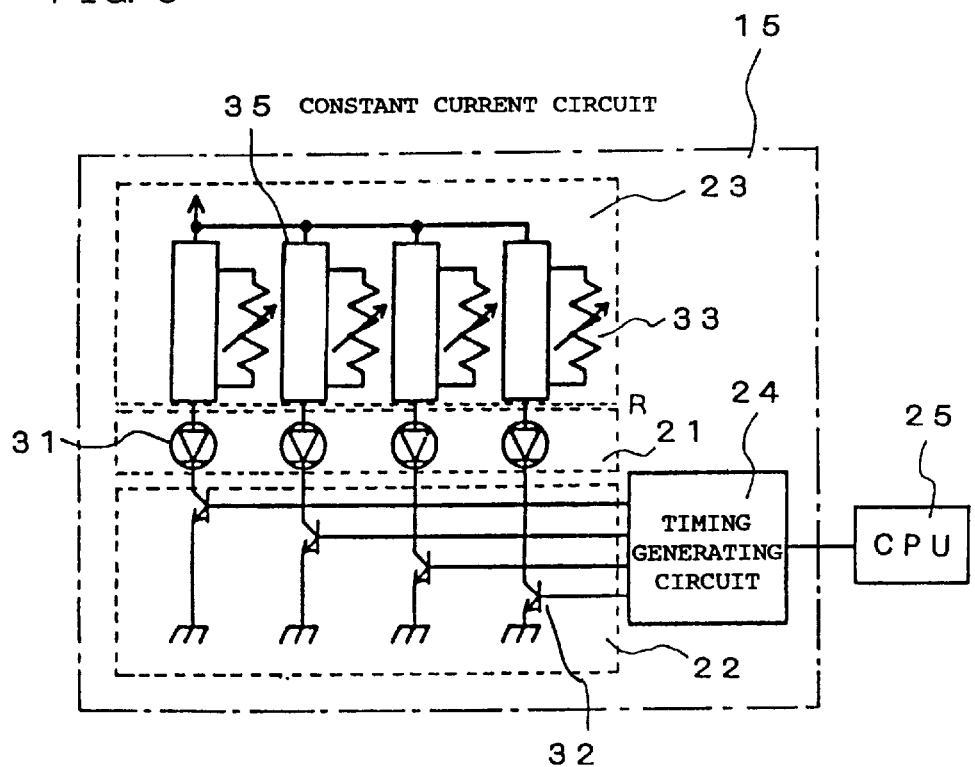
FIG. 3 is a diagram illustrating another example of the exposure apparatus having a function of adjusting variations in LED brightness.

The printing apparatus that performs initial setting of the LEDs using semi-fixed resistors as described above with reference to FIGS. 2 and 3, is not able to cope with changes in printing environments, such as temperature, through brightness adjustment. In contrast, the exposure apparatus and the exposure method of this embodiment are able to reflect the interior temperature of the exposure head 15, the sensitivity of each photosensitive sheet, and the like, and thereby calculate set values Ds suitable to the present exposure conditions. Using the set values Ds, the value of current or voltage supplied to the LEDs 31 can be dynamically controlled. Since changes in printing environments can be coped with by adjusting brightness, it is possible to print images with stable high quality under various printing environments without needing to adjust the exposure duration by changing the exposure timing in correspondence to temperature changes, the sensitivity of photosensitive sheets, or the like.

In the exposure apparatus 20 of this embodiment, the set values Ds to be supplied to the light source units 29R, 29G, 29B are calculated using, as a reference, the set value at the time of correction stored in the EE-PROM 27. The set value Ds0 at the time of correction is determined by performing brightness adjustment of the LEDs 31 during the production process of the printer. In one method, a set value Ds for each color, which is handled as a preset predetermined amount of light (brightness), is determined by measuring the total brightness of the four LEDs 31 of each color using a brightness measuring device, and by feeding the brightness back to the CPU. A set value Ds for each color when a predetermined amount of light is obtained is set as a set value Ds0 at the time of correction, and then stored into the temperature coefficient table of the EE-PROM 27 together with the temperature detected at that time. The correction operation is thus completed.

A second method uses a photosensitive material and is performed in the following procedure.

1. Set the set value Ds to be supplied to the D/A converter 39 to an appropriate value (for example, median).
2. Perform gray-scale printing in each color.
3. Measure the printed result using a reflection densitometer, and read the gray level at which the color is at a proper density.
4. Calculate a proper value of the set value Ds from the value measured by the reflection densitometer, and re-set to the proper value.
5. Print a gray scale in each color again, and measure the density.
6. Repeat steps 4 and 5 until a proper density is obtained. After a proper density is obtained, write a set value corresponding to the proper density, as a set value Ds0 at the time of correction, into the temperature coefficient table of the EE-PROM 27 together with the temperature (inside the exposure head).

If correction is performed by the second method, it is preferable to write into the EE-PROM 27 data regarding the sensitivity of the photosensitive sheets used, as well. The data of the set value Ds0 at the time of correction written into the EE-PROM 27 may also be a value that contains the temperature at the time of correction, photosensitive sheet sensitivity variation. It is also possible to write thereinto a value standardized for a predetermined temperature or photosensitive sheet sensitivity. Since the exposure apparatus 20 of this embodiment is able to adjust brightness by digital correction controlled by the CPU as described above, it is possible to fully automate the correction operation, thereby eliminating the conventional complicated operations of initially setting many semi-fixed resistors. Furthermore, it is possible to automate the assembly of printers including the correction operation. Therefore, the invention greatly contributes to cost reductions of exposure apparatuses and printers.

To adjust the characteristics of the LEDs in the exposure apparatus 20 of this embodiment, the semi-fixed resistors are not adjusted but data at the time of correction is stored into the rewritable EE-PROM 27. Therefore, the correction can be made after purchase by a user, in addition to the correction performed in a factory. For example, when the printer 10 is connected to a personal computer, the printer 10 can be controlled by a correction program, via the buffer 19. If the aforementioned second method is employed, it is possible to expose photosensitive sheets for correction while comparing the density with the reference density and changing the set values Ds for the individual colors, and to instruct to rewrite data stored in the EE-PROM 27, such as the set value Ds, when a predetermined density is obtained. It is also possible to rewrite the set value Ds in the temperature coefficient table of the EE-PROM 27 by substantially the same method so that colors and color tones in accordance with the user's taste can be obtained. After the correction, the printer 10 dynamically calculates appropriate set values Ds based on the updated set value Ds and temperature at the time of correction, taking into consideration the interior temperature of the exposure head 15 at the time of exposure, the sensitivity of the photosensitive sheet to be exposed, and user's taste. Therefore, the conditions of exposure by each light source unit 29R–29B can be controlled.

The power supplying circuit and the switching circuit described above are examples of the small-size and low-price circuits that employ a single transistor switch to enable the constant-current control and the on-off timing control. However, the invention is not limited by the above-described circuits. The power supplying circuit having the function of supplying the LEDs with a predetermined current corresponding to the set value outputted from the CPU may be constructed on the basis of other control methods, such as PWM control. Furthermore, it is possible to perform the gradation control on the side of the power supplying circuit. The switching circuit may also be constructed using other switching elements, such as MOS. In the invention, it is possible to provide a sufficiently high quality image by using a switching circuit having a resolution that matches the gradation level of images. Further, although the exposure head in this embodiment employs a light emitting source that has four LEDs for each color, it should be understood that the number of LEDs for a color is not limited to four. It is also possible to use light-emitting elements other than LEDs, for example, semiconductor lasers and the like.

Timing Generating Circuit

Figure 6:
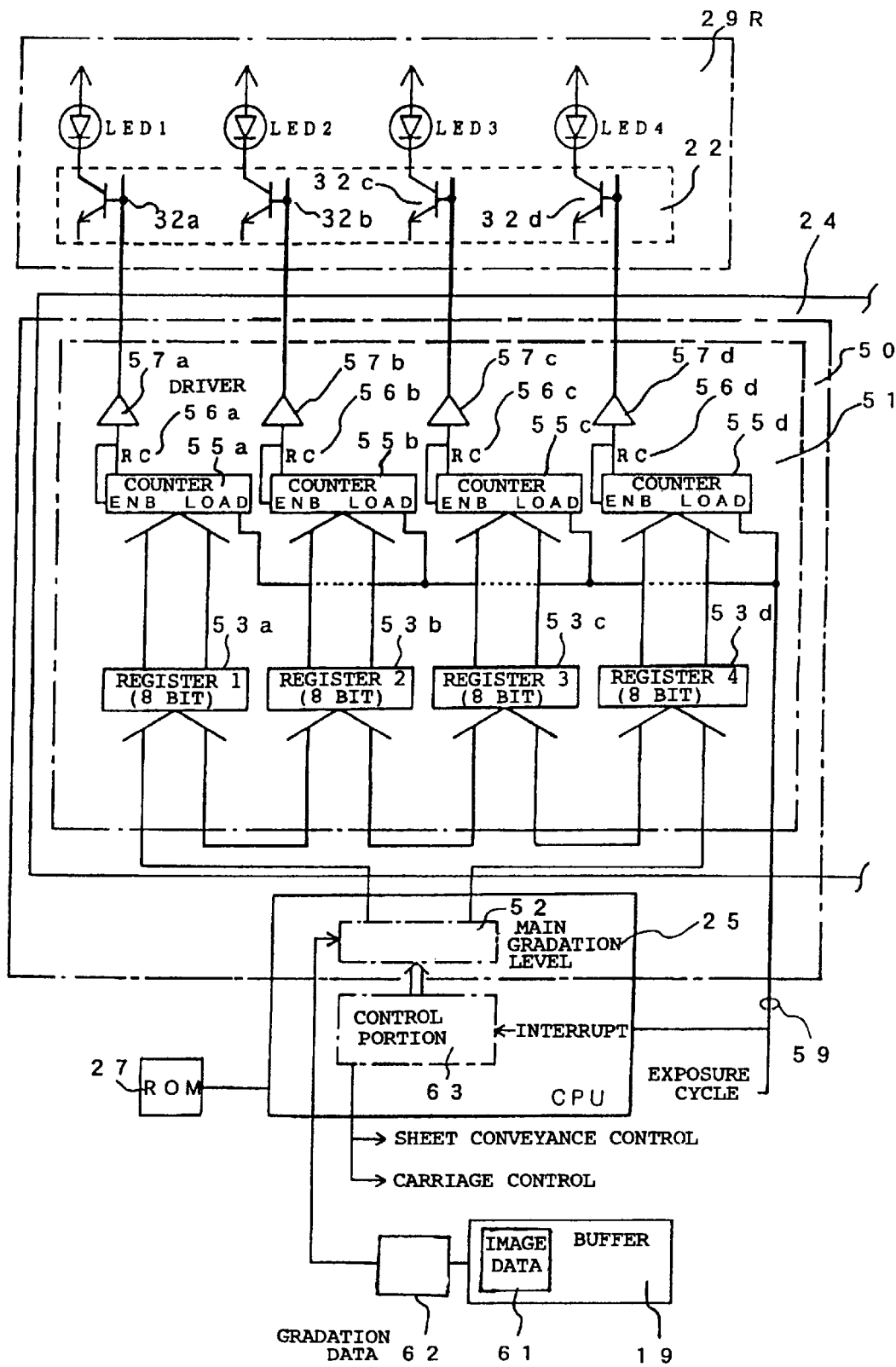
FIG. 6 is a block diagram schematically illustrating a timing generating circuit of a printer according to the invention.

FIG. 6 illustrates the timing generating circuit 24 in detail. The timing generating circuit 24 also has gradation level control portions with the same construction corresponding to the light source units 29R, 29G, 29B. The following description will be made in conjunction with a gradation level control portion 51 that supplies timing signals to the light source unit 29R. The gradation level control portion 51 of the timing generating circuit 24 has four 8-bit registers 53a–53d and four 8-bit counters 55a–55d corresponding to the four LEDs 31 (in the description below, referred to as "LED1, LED2, LED3, LED4"). The four 8-bit registers 53a–53d and the four 8-bit counters 55a–55d form a gradation setting portion, which is supplied with 8-bit data divided from 10-bit data, from the CPU 25 having a function of a main gradation level control portion 52. At timing when the 8-bit data is counted, a timing signal is outputted to the LED1–LED4 for controlling exposure duration. Therefore, in this embodiment, the CPU 25 and the timing generating circuit 24 form a gradation control portion 50 that sets a gradation level for gradation expression in the switching circuit 22, which is a time control portion.

In exposure apparatuses, such as the exposure apparatus of this embodiment, which employ semiconductor elements (light-emitting elements), such as LEDs, lasers or the like, as light sources, exposing the identical dot (pixel) by a plurality of light sources is considered in order to secure a certain amount of exposure. In the serial printer 10 shown in FIG. 1, in which the carriage 13 carrying the exposure head 15 is moved in the scanning directions X and a photosensitive sheet is moved in the sheet conveying direction Y by the sheet conveying roller 11, the exposure head 15 is moved over a front surface of a photosensitive sheet. Therefore, the same or identical dot can be repeatedly exposed to radiation of light (exposure light) from the light-emitting elements suitably arranged in the exposure head 15. In a printer in which light-emitting elements are arranged in an array extending in the scanning directions X, it is also possible to expose each dot to light from a plurality of light sources if a plurality of light-emitting elements of each color are suitably arranged.

If a plurality of light sources, such as LEDs, are used to expose a photosensitive member (photosensitive sheet), the amount of exposure becomes the multiplication product of the light intensity (brightness) of light emitted from the light source and the exposure duration. Therefore, to perform exposure control by changing the amount of exposure of each dot to be exposed, two methods may be considered, that is, changing the light intensity of emitted light, or changing the exposure duration. If light sources, such as LEDs or the like, are used, it is very difficult to dynamically change the light intensity of emitted light for each dot. Therefore, the method wherein the exposure duration is controlled is normally selected for the gradation control as in this embodiment. Several exposure duration control methods may be considered, for example, a binary control method in which exposure is performed, or not performed, during the entire time of an exposure cycle (which is a set interval for irradiation of a dot with light for exposure (exposure light) from a light source When an exposure cycle period for a dot elapses, the exposure process for the next dot is started), a method in which the light emission duration of the light sources, such as LEDs, is more finely controlled by duty control within the exposure cycle period, and the like.

If exposure is performed by, for example, using exposure light emitted from four LEDs for one dot, several methods may be considered, for example, a first method in which exposure is performed on the basis of a combination of only the on/off control of the four LEDs, a second method in which exposure is performed on the basis of the on/off control of three LEDs and the duty control of the remaining one LED, a third method in which exposure is performed on the basis of the duty control of the four LEDs, and the like.

The first method requires only simple hardware, but is able to express only 5 gradations of 0–4. This is not practical since images formed on photosensitive sheets presently need at least about 256 gradations. Furthermore, the light emitting duration of the four LEDs are not equal but the light emitting duration of some of them becomes very long. Therefore, the deteriorating rate is great, and the characteristics of the LEDs are likely to change. Thus, it is difficult to form stable images, over a long time.

Figures 7, 8:
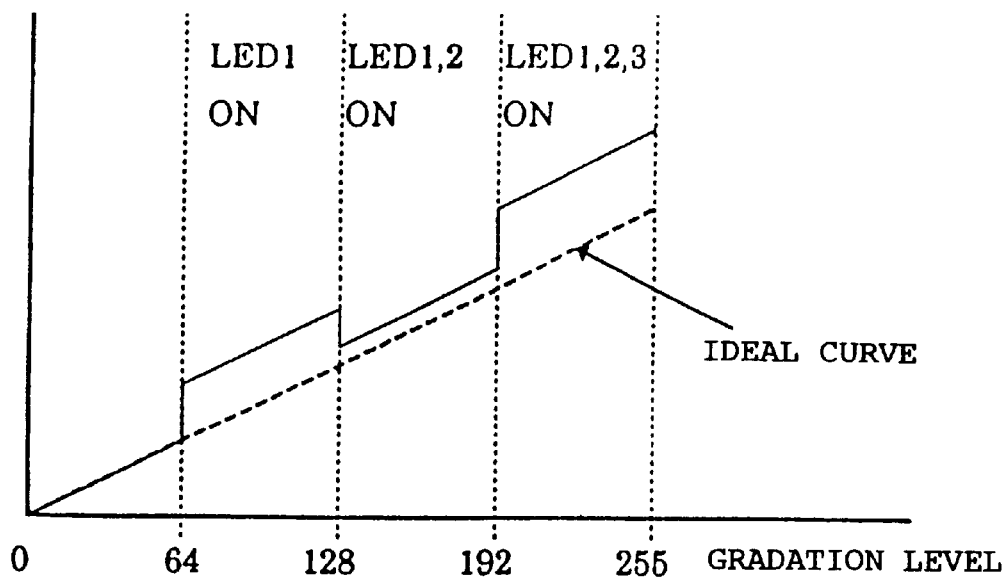
FIG. 7 shows control states of four LEDs at the time of exposure performed by gradation control of one of the LEDs.
FIG. 8 is a graph indicating the characteristics of amount of exposure where the control method indicated in FIG. 7 is employed.

The second method enables fine gradation control of about 256 gradations simply by fine control, for example, 64-gradation control, of one LED (LED4 in this embodiment) and on/off control of the other three LEDs as shown in FIG. 7. Since this method does not require very complicated hardware, it is possible to provide a low-price exposure head capable of multi-gradation control. However, the individual LEDs have characteristic variations. Therefore, considering the brightness variations of the four LEDs, the amount of exposure deviates from an ideal exposure amount-gradation level curve as shown in FIG. 8 every time a LED to be on/off controlled emits light. That is, continuous and smooth gradation levels cannot be expressed, but there occur regions of stepwise changes. Therefore, there arise problems of uneven color development in an image formed on a photosensitive sheet, or likely deterioration of color balance, and the like. Furthermore, LEDs have characteristics that the brightness changes due to heat generation. Since the drive duties of the four LEDs differ from one another in the second method, the extent of heat generated during exposure also varies. Therefore, even if the brightness of the four LEDs in an exposure apparatus are equal in an initial state, the brightness of a LED with a high duty decreases and deviates from the ideal gradation level curve as exposure is repeated. Furthermore, if a certain LED has a duty considerably different from those of other LEDs, the service life of the product may decrease.

The third method is able to turn on the four LEDs with the same duty. Therefore, multi-gradation control can be performed without the aforementioned stepwise gradation level fluctuations nor the problem of brightness changes during exposure. However, this method requires hardware for multi-gradation control with a resolution of, for example, 256 levels, if an image with 256 gradations for each dot is to be formed by exposure. Since the change in the color development density of actual photosensitive sheets is not linear relative to the change in exposure amount, there is a need to perform gamma-correction wherein exposure amount is adjusted so that the change in color development density becomes linear. Therefore, to realize linear color development density of 256 gradations, the exposure amount control needs to have a resolution higher than 256 gradations. In the case of exposure of a photosensitive material such as a Cycolor medium, the control needs to have a resolution of about four times as high as the gradation. To form an image with 256 gradations, an exposure control circuit having a resolution of about 1000 (10 bits) is needed. Therefore, the third method requires a control circuit capable of controlling exposure duration with about 1000 gradations for each LED, resulting in a very high hardware cost. Furthermore, to avoid an increase of the printing time, an increase of the exposure cycle period must be avoided. Therefore, for higher gradation levels, hardware with a very fast processing rate becomes needed, which is another factor to increase the costs of exposure apparatuses and printing apparatuses. Thus, although the third method is favorable to form multi-gradation images, the third method steeply increases the cost of an exposure apparatus having a high resolution of about 1000 gradations, which is normally required for actually-used color printers and the like. It is difficult to employ such an exposure apparatus in printers for personal use or the like which are used together with personal computers at offices or homes.

The exposure apparatus of this embodiment employs the gradation control portion 50 capable of performing multi-gradation level control and maintaining substantially constant duties of individual light sources, for exposure of dots (pixels) to exposure light emitted from the light sources. The gradation control portion 50 can be realized by low-price hardware. Furthermore, the gradation control portion 50 of this embodiment is designed to perform multi-gradation level control within a limited exposure cycle period, without requiring a considerably increased processing rate. Further, since correction for changes in the printing environments is performed on the side of the power supplying circuit 23 so that the load on the gradation control portion 50 is reduced, it is possible to realize an exposure apparatus with a fast exposure rate.

Referring back to FIG. 6, the gradation control portion 50 of this embodiment will be further described. The exposure apparatus 20 of this embodiment is equipped with the light sources LED1–LED4. The gradation control portion 50 is provided with the gradation level control portion 50 for supplying gradation data to the LED1–LED4, and the main gradation level control portion 52 for converting gradation information (gradation data) supplied from an image data storing portion 61 in the buffer 19 via a gradation data supplying portion 62, into gradation data of the LED1–LED4 to be turned on, and setting it in the gradation level control portion 51.

The gradation level control portion 51 is provided with the four 8-bit registers (gradation level setting portions) 53*a*–53*d* and the four 8-bit counters 55*a*–55*d* corresponding to the LED1–LED4. The counters 55*a*–55*d* output signals (ripple carriers, RC) 56*a*–56*d* which become a high level when a value set in the corresponding counter and down-counting is started, and which become a low level when down-counting is completed so that the counter value becomes 0. The signals RC 56*a*–56*d* are returned to the enable terminals of the corresponding counters 55*a*–55*d* so that when counting is completed, counting is stopped until data is set in the counters 55*a*–55*d* at the beginning of the next exposure cycle.

The signals RC 56*a*–56*c* are supplied to the transistors 32*a*–32*d* in the switching circuit 22, via buffer drivers 57*a*–57*d*. As described above, when the signal RC is at the high level, the corresponding buffer drivers 57*a*–57*d* become open-collector, so that the corresponding LED1–LED4 are supplied with power to emit light with a suitable brightness, thereby turning on the LEDs. Although, in this embodiment, the timing generating circuit 24 is mounted in the exposure head 15, and is supplied with gradation data from the CPU 25 through a flexible cable or the like, the circuit arrangement is not limited to this embodiment. For example, it is also possible to provide the timing generating circuit 24 on a base board separate from the exposure head 15, or to provide the counters 55*a*–55*d* and the registers 53*a*–53*d* on different base boards.

In the exposure apparatus 20 of this embodiment, the gradation data supplied from the gradation data supplying portion 62 to the main gradation level control portion 52 is 10-bit data, so that about 1000 gradations can be instructed. The main gradation level control portion 52 receives the 10-bit gradation data, and changes it into 8-bit gradation data in the flow illustrated in FIG. 9, and supplies the data to the registers 53*a*–53*d* of the gradation level control portion 51. In step ST11, the main gradation level control portion 52 obtains from the gradation data supplying portion 62 10-bit gradation data x for the dot which, for example, the LED4 faces in the next exposure cycle. Subsequently in step ST12, the data of the higher eight bits of the gradation data x is set in the register (R) 53*d* corresponding to the LED4. In step ST13, the data of the lower two bits of the gradation data x is checked. If the data of the lower two bits is a predetermined value corresponding to the LED4, 1 is added to the value of the register (R) 53*d* in step ST14.

This embodiment converts 10-bit gradation data into 8-bit gradation data by cyclically increasing the gradation levels of the four LED1–LED4 in the above-described manner. Therefore, if the lower two bits of the gradation data x are "00", step St14 is not performed for any of the registers 53*a*–53*d* corresponding to the LED1–LED4, so that the LED1–LED4 emit light for the same exposure duration. If the lower two bits of the gradation data x are "01", the value of the register, for example, 53*d* corresponding to the LED4, is incremented by 1, so that only the LED4 emits light for a one-level longer duration than the other LEDs. That is, the total exposure duration by the LED1–LED4 is increased by an amount of one level. Similarly, if the lower two bits of the gradation data x are "10", the values of the registers 53*c*, 53*d* corresponding to the LED3 and LED4 are incremented by 1, so that the LED3 and the LED4 emit light for a one-level longer duration. That is, the total exposure duration is increased by an amount of two levels. If the lower two bits of the gradation data x are "11", the values of the three registers 53*b*–53*d* corresponding to the LED2–LED4 are incremented by 1, so that the total exposure duration is increased by an amount of three levels.

Due to step ST15, the above-described steps are repeated until 8-bit gradation data is set into all the registers 53*a*–53*d* corresponding to the LED1–LED4. When 8-bit gradation data is set in the registers 23*a*–23*d*, the values of the registers 53*a*–53*d* are loaded into the counters 55*a*–55*d* in step ST16 when the start signal 59 of the next exposure cycle enters a control portion 63 of the CPU 25. Then, the LED1–LED3 emit light until the values of the counters 55*a*–55*d* are counted down to zero as described above.

Through the processing as described above, the 10-bit gradation data x is converted into 8-bit gradation data, and the LED1–LED4 are turned on at the respective duties instructed by the 8-bit gradation data. The exposure apparatus 20 of this embodiment is not designed such that exposure light from the LED1–LED4 simultaneously strikes each dot. However, the exposure head 15 is moved in the scanning directions X and the medium 1 is conveyed so that each dot receives exposure light from the LED1–LED4 at intervals of exposure cycle periods. That is, the total exposure duration for each dot is obtained as a sum of the light-emitting durations of the individual LED1–LED4. Therefore, although the LED1–LED4 are controlled on an 8-bit basis, 10-bit resolution is obtained in terms of the total exposure duration.

Figures 10, 11:
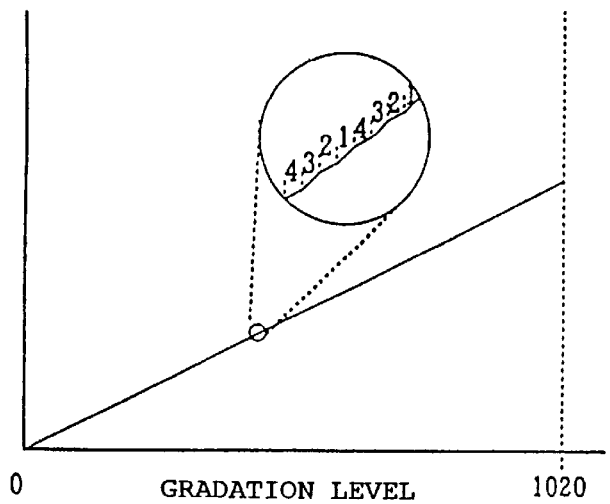
FIG. 10 shows control states of LEDs based on the exposure method illustrated in FIG. 9.
FIG. 11 is a graph indicating the characteristics of amount of exposure by the control method illustrated in FIG. 9.

FIG. 10 shows examples of the 8-bit gradation levels allotted to the LED1–LED4 for the 10-bit gradation data x indicating gradation level. The exposure apparatus 20 of this embodiment performs exposure to a color using four LED1–LED4. Therefore, if the 10-bit gradation data x increases or decreases by 4 level, the gradation data of each of the LED1–LED4 is cyclically increased or decreased by one level. Thereby, 10-bit resolution can be achieved as a result of the total exposure by the LED1–LED4. Furthermore, if a dot is exposed to light from the LED1–LED4, the LED1–LED4 emit light in substantially the same conditions (duties), with the exposure duration by the LED1–LED4 varying by at most one level. Therefore, it is possible to provide each dot with amount of exposure that linearly corresponds to the 10-bit gradation levels in overall view although, in a microscopic view, the brightness variation of the LED1–LED4 appears as indicated in FIG. 11. Since the control of the light sources LED1–LED4 is performed based on 8-bit gradation control, it is possible to employ 8-bit registers and counters. Furthermore, since the data transferred from the CPU 25 to the registers is also 8-bit data, the processing rate can be improved, and the need to considerably increase the hardware speed is eliminated.

In the exposure apparatus 20 of this embodiment, if the value of 10-bit gradation data x exceeds 1020 (1111111100 in binary), the 8-bit gradation data to be supplied to the LED1–LED4 is overflown. Therefore, if gradation data exceeding 1020 is supplied to the main gradation level control portion 35, a limiter is provided so that the maximum gradation data in 8 bits can be supplied to the LED1–LED4. With this construction, the exposure apparatus 20 of this embodiment prevents occurrence of failures or defects during print processing, and prevents uneven color development in a printed image, and therefore prevents deterioration of image quality, even if there is data exceeding 1020.

Furthermore, since this embodiment uses four light sources (LEDs) to express gradation levels instructed in 10 bits, the data of the higher 8 bits of the 10 bits corresponding to the result of division of the 10-bit data by 4 is unconditionally set in the register of each light source while the data of the lower 2 bits corresponding to the remainder of division of 10-bit data by 4 is used to increase the gradation level of the corresponding light source by 1 for fine adjustment.

It should be apparent that the invention is not limited by the construction having four light sources or four groups of light sources. The invention can be applied in an exposure apparatus that performs exposure using m number of light sources or m number of groups of light sources in accordance with the amount of light or kind of individual light sources. To control the amount of exposure at a maximum n (integer) of gradation levels using m number of light sources or m number of groups of light sources, it is necessary to control the individual light sources at l number of gradation levels, wherein l is an integer of n/m. Therefore, it becomes necessary to provide in the gradation level control portion a gradation level setting portion, such as a register, which is capable of setting gradation data of at least l number of gradation levels. If the gradation data for a given dot is at gradation level i, an integer value j and a remainder k are obtained through division of the gradation level i by m. For the light sources pre-set within the kth position in the m number of groups of light sources, the gradation level is set to j+1. For the other light sources, the gradation level is set to j. If each dot is exposed on the basis of control of m number of light sources at l number of gradation levels which is less than n number, the total amount of exposure has a resolution of n number of gradation levels as stated above. Therefore, the circuits for controlling the individual light sources can be simplified, thereby providing a low-price exposure apparatus having a high processing rate and a high resolution. Furthermore, since a dot is exposed to light emitted from individual light sources at substantially equal duties, the individual variation of the light sources will not evidently show, but a substantially linear characteristic is obtained. Further, since the individual light sources emit light at equal gradation levels (exposure duration, or duty), it is possible to prevent inconvenient incidents where a particular light sources quickly deteriorates or changes in characteristics due to temperature. Further, the exposure apparatus and the exposure method of this embodiment make it possible to realize an exposure apparatus having substantially linear characteristics as mentioned above while employing, as light sources, LEDs, which are inexpensive and stable light sources but have disadvantages in that the range of individual variation is normally unignorable and in that a single LED element is not sufficient to provide a required amount of light for exposure of a photosensitive medium. Therefore, it becomes possible to provide a low-price and small-size printing apparatus, such as a color printer, that is suitable for personal use and capable of printing high-quality images.

The exposure method of this embodiment can be applied to an exposure apparatus that simultaneously turns on a plurality of light sources, such as LEDs, and converges the light therefrom onto a single dot using a lens system or the like. The exposure method of this embodiment is also applicable to an exposure apparatus that has an array of many light sources, such as LEDs, arranged in the scanning directions and simultaneously exposes a row or rows of dots in the scanning direction.

Figure 9:
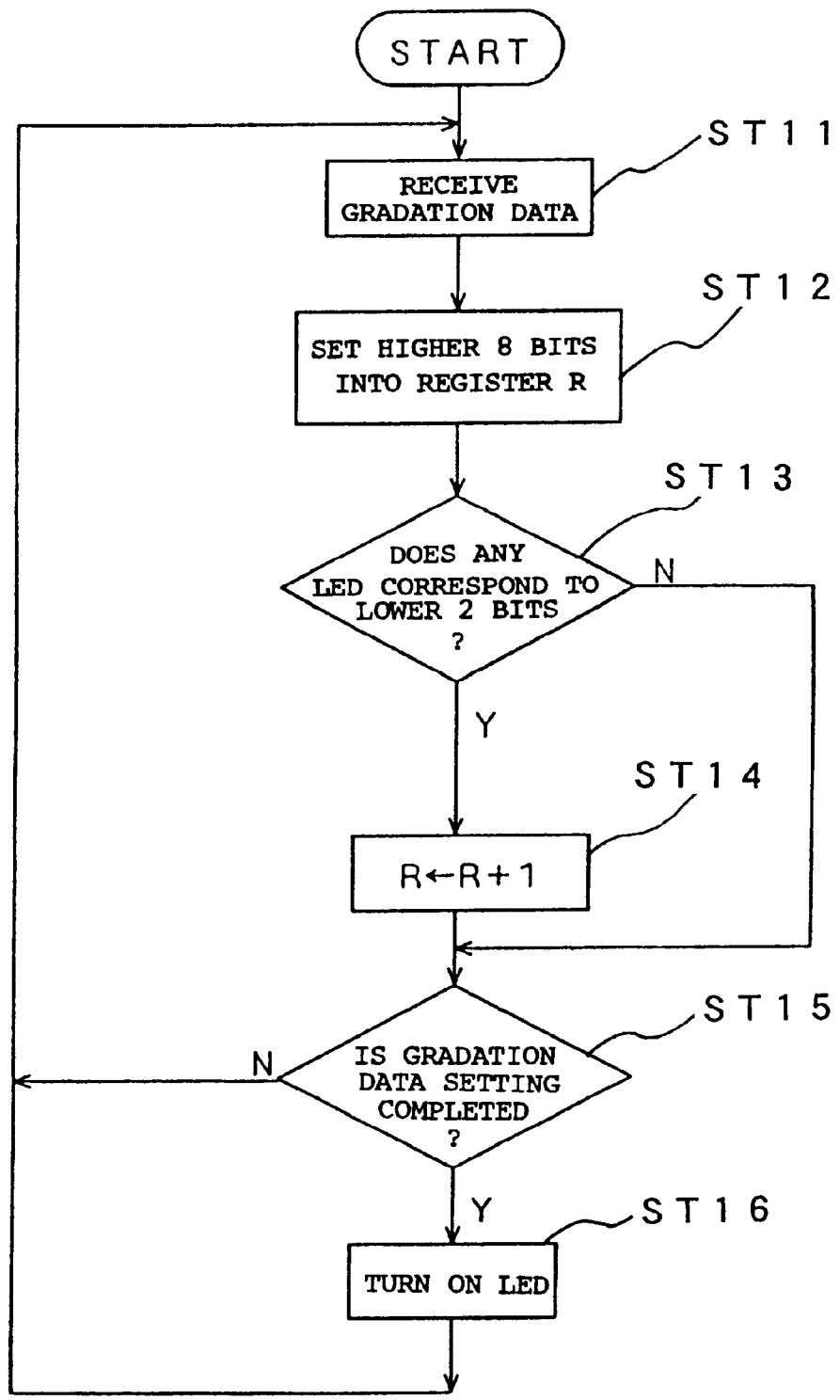
FIG. 9 is a flowchart illustrating an exposure method wherein the timing generating circuit shown in FIG. 6 is employed.

Although, in the above-described embodiments, the registers are used to distribute a multi-gradation level cyclically to the LEDs, similar processing may be performed by software using the CPU. In such a case, a program having instructions to perform the processing equivalent to the steps illustrated in FIG. 9 is pre-stored in the ROM 27, and loaded into the CPU 25 at a suitable timing to perform the processing.

Figure 1:
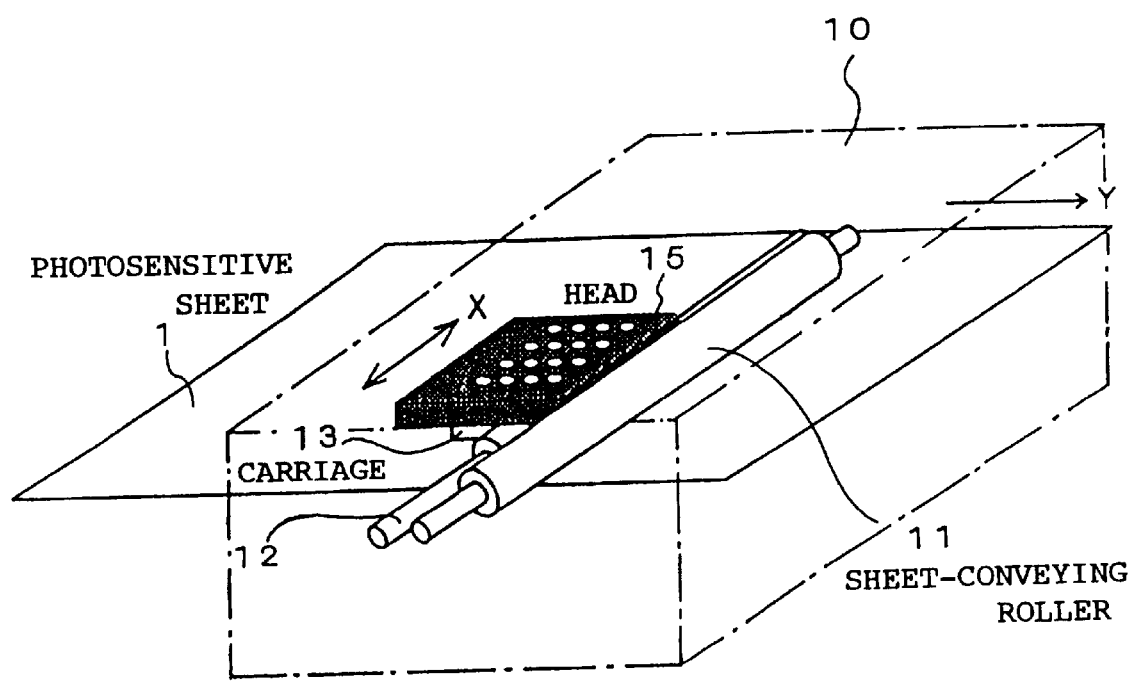
FIG. 1 is a diagram schematically illustrating a construction of a printing apparatus that exposes a photosensitive using LEDs as light-emitting elements.

The exposure apparatus and the exposure method of this embodiment described above are applicable to not only a type of printing apparatus wherein the exposure head is moved as shown in FIG. 1, but also any printing apparatus employing light-emitting elements, such as LEDs, for example, a printing apparatus wherein the light-emitting elements are arranged in an array extending in the direction of width of a print sheet. By providing means for moving a print sheet relative to the light-emitting elements, it becomes possible to provide a low-price, small-size, highly reliable printing apparatus capable of forming a stable, high-quality image on a print sheet.

As described above, the invention comprises a power supplying circuit having a power control function capable of adjusting brightness of a light-emitting element, such as an LED, by dynamically controlling the power supplied to the light-emitting element, and a timing generating circuit having a time control function capable of dynamically controlling exposure duration. By using the timing generating circuit to perform gradation control and using the power supplying circuit to perform brightness adjustment, the invention is able to correct exposure conditions for changes in environments, such as temperature and the like. Therefore, correction for variations in temperature or photosensitive sheet sensitivity or the like can be performed without imposing a burden on the side of gradation control, so that exposure can be performed in optimal conditions, even in environments where temperature or photosensitive sheet sensitivity varies. Furthermore, since a burden of correction for temperature or the like is not imposed on the side of gradation control, it is possible to correct for the temperature characteristics of a photosensitive medium or correct for variations among lots or the like, without degrading the resolution of gradation expression, and to perform high quality printing with multi-gradation and high resolution.

The exposure apparatus of the invention is able to perform digital control of brightness adjustment using a CPU, so that complicated adjustment operation using semi-fixed resistors can be eliminated. Therefore, it is possible to fully automate the production, including correction of exposure apparatuses on the production line, and therefore considerably reducing the production cost.

For exposure of a photosensitive medium using a plurality of light sources, the exposure apparatus of the invention sequentially changes the gradation level of each light source and controls each light source at gradation levels that are fewer than the gradation levels for each dot. Therefore, the exposure apparatus is able to perform processing at a fast rate and forms a multi-gradation image using relatively simple hardware. Further, since a plurality of light sources are turned on at substantially equal gradation levels at any gradation level, the individual variation of the light sources hardly appears but the amount of exposure obtained becomes substantially linear to the gradation levels. Further, it is possible to prevent incidents where a particular light source deteriorates relatively quickly or changes in characteristics to affect the gradation levels.

Since the invention is able to dynamically perform adjustment of brightness using a control mechanism separate from that for gradation control and realize high gradation level control using simple hardware, it becomes possible to provide a low-price exposure apparatus and a low-price printing apparatus capable of processing a multi-gradation image with a high resolution at a fast rate. Furthermore, it is possible to realize a color printing apparatus which uses inexpensive light sources, such as LEDs, but is capable of forming, at a fast rate, a high-quality image with good color balance and reduced color distortion, and which is easy to use together with personal computers or the like at offices or homes.

INDUSTRIAL APPLICABILITY

The invention is an exposure apparatus and an exposure method which are suitable to a compact-size printer capable of full-color printing with multi-gradation using a photosensitive sheet, such as a Cycolor medium. The invention makes it possible to provide a low-price printer suitable for personal use and capable of high-quality printing using a photosensitive medium.

What is claimed is:

1. An exposure apparatus comprising:
   an integer number (m) of light-emitting element groups that emit light for exposure of a photosensitive sheet;
   a power control circuit portion operatively connected for controlling power to be supplied to said light-emitting element groups;
   a time control circuit portion operatively connected for controlling duration of exposure by said light-emitting element groups;
   a gradation control circuit portion operatively connected to establish a gradation level for gradation expression using one of said power control circuit portion and said time control circuit portion;
   said gradation control circuit portion having a main gradation level control portion for receiving a gradation information signal capable of specifying at least an integer number (n) of distinct gradation levels, said gradation control circuit portion further including integer number (m) of gradation level setting portions operatively connected to said main gradation level control portion, each gradation level setting portion for establishing a gradation level of a corresponding light emitting element group, each gradation level setting portion selectively configurable to establish an integer number (l) of different gradation levels to its corresponding light emitting element group, where the integer number (l) is equal to or greater than an integer obtained by dividing the integer number (n) by the integer number (m);
   wherein said main gradation level control portion sets a desired total gradation level of integer number (i) by:
   setting a gradation level of integer number (j) into integer number (m−k) of said gradation level setting portions, wherein the integer number (j) is obtained by dividing the integer number (i) by the integer number (m), and integer number (k) is a remainder obtained by the same division, and
   setting a gradation level of integer number (j+1), into integer number (k) of said gradation level setting portions.

2. An exposure apparatus according to claim 1, wherein the gradation expression is effected by said time control portion.

3. An exposure apparatus according to claim 2, further comprising:
   a set value control circuit portion operatively connected to said power control circuit portion for changing a value of current or voltage to be supplied from said power control circuit portion to said light-emitting element;
   a temperature sensor that detects a temperature in the vicinity of said light-emitting element; and
   a memory operatively connected to receive and store data regarding a temperature from said temperature sensor and for storing the value of current or voltage supplied to said light-emitting element when brightness of said light-emitting element is corrected,
   said set value control circuit portion operatively connected to said memory and operable to control the value of current or voltage to be supplied to said light-emitting element, on the basis of data in said memory and the temperature detected by said temperature sensor.

4. An exposure apparatus according to claim 2, further comprising:
   a set value control circuit portion operatively connected to said power control circuit portion for changing a value of current or voltage to be supplied from said power control circuit portion to said light-emitting element; and
   an input circuit portion for receiving input information regarding at least one light sensitivity characteristic of a photosensitive sheet,
   said set value control circuit portion operatively connected to said input circuit portion and operable to correct the value of current or voltage to be supplied to said light emitting element on the basis of the information regarding the light sensitivity characteristic of the photosensitive sheet.

5. A printing apparatus comprising an exposure apparatus as claimed in claim 1, and a conveying apparatus that conveys at least one of a photosensitive sheet and said exposure apparatus at a predetermined timing relative to each other.

6. An exposure apparatus according to claim 1 wherein,
   the integer number (m) is equal to four, and the exposure apparatus has four light-emitting element groups;
   said gradation information signal comprises a 10 bit digital signal;
   said gradation control circuit portion has said main gradation level control portion to which the full 10 bits of the gradation information signal is inputted, and said gradation level setting portions into which 8-bits of the gradation information signal can be set; and
   said main gradation level control portion sets the higher 8 bits of the gradation information signal into each of said gradation level setting portions and, if the lower 2 bits of said gradation information signal are greater than zero, said main gradation level control portion adds binary 1 to a number of said gradation level setting portions corresponding to the decimal number represented by the lower 2 bits of the gradation information signal.

7. An exposure apparatus according to claim 6, characterized in that said gradation control circuit portion is connected for setting a gradation level for gradation expression into said time control circuit portion and controlling the duty of said light-emitting elements.

8. A method for forming an image by exposure of a photosensitive sheet using light-emitting elements, comprising:

(a) a step of providing integer number (m) light-emitting element groups each connected for control by a respective gradation level setting circuit;

(b) a step of setting a duration of exposure of each light-emitting element group on the basis of information regarding a desired gradation level of an image defined by integer number (i), including:

($b_1$) setting a duration of exposure corresponding to a gradation level of integer number (j) into integer number (m−k) of said gradation level setting circuits, wherein the integer number (j) is obtained by dividing of the integer number (i) by the integer number (m), and the integer number (k) is a remainder obtained by the same division, and ($b_2$) setting a duration of exposure corresponding to a gradation level of integer number (j+1) into integer number (k) of said gradation level setting circuits (c) a step of performing exposure by supplying each light-emitting element group with a current or voltage for the duration of exposure set into its corresponding gradation level setting circuit in the previous step.

9. A method according to claim 8, further comprising:

a step of detecting a temperature in the vicinity of at least one light-emitting element group;

a step of comparing the temperature detected with a temperature at a time of correction of brightness of the light-emitting element group, and setting the current or voltage supplied to the light-emitting element group for exposure on the basis of the current or voltage supplied to the light-emitting element group at the time of the correction.

10. A method according to claim 8, further comprising:

a step of correcting the current or voltage supplied to the light-emitting element group on the basis of information regarding at least one light sensitivity characteristic of a photosensitive sheet.

11. A method according to claim 8 wherein each of the gradation level setting circuits comprise 8-bit circuits and wherein the integer number (m) is equal to four;

wherein the step of setting a duration of exposure comprises a step of setting a higher 8 bits of a 10-bit gradation level information signal, which ten bits define the integer number (i), into each of the 8-bit gradation level setting circuits, and, if the lower 2 bits of said gradation information signal are greater than zero, adding binary 1 to a number of said gradation level setting circuits corresponding to the decimal number represented by the lower 2 bits of the gradation information signal; and in said step of performing exposure, each light-emitting element group is turned on at duty corresponding to the value set in its corresponding gradation level setting circuit.

* * * * *

UNITED STATES PATENT AND TRADEMARK OFFICE
CERTIFICATE OF CORRECTION

PATENT NO.    : 6,130,700
DATED         : October 10, 2000
INVENTOR(S)   : Fumitaka Murayama, Fumiyoshi Ito and Satoru Takizawa It is certified that error appears in the above-identified patent and that said Letters Patent is hereby corrected as shown below:

Title Page,
Item [54] and column 1, line 1, replace "ALIGNER, EXPOSURE METHOD AND PRINTER" with -- EXPOSURE APPARATUS, EXPOSURE METHOD AND PRINTING APPARATUS --.

Signed and Sealed this

Ninth Day of October, 2001

*Attest:*

NICHOLAS P. GODICI
*Attesting Officer*     Acting Director of the United States Patent and Trademark Office